(12) United States Patent
Masunaga et al.

(10) Patent No.: US 7,870,281 B2
(45) Date of Patent: Jan. 11, 2011

(54) CONTENT PLAYBACK DEVICE, CONTENT PLAYBACK METHOD, COMPUTER-READABLE STORAGE MEDIUM, AND CONTENT PLAYBACK SYSTEM

(75) Inventors: Shinya Masunaga, Tokyo (JP);
Yoshikatsu Niwa, Kanagawa (JP);
Tsunemitsu Takase, Tokyo (JP);
Tomoaki Takemura, Tokyo (JP);
Junichi Otani, Tokyo (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 12/187,485

(22) Filed: Aug. 7, 2008

(65) Prior Publication Data
US 2009/0043908 A1    Feb. 12, 2009

(30) Foreign Application Priority Data
Aug. 8, 2007    (JP)    ............... 2007-206737

(51) Int. Cl.
*G06F 15/16*    (2006.01)
(52) U.S. Cl. .................. 709/231; 709/203; 709/219; 709/226; 725/54; 725/55; 725/88; 725/89; 725/90; 725/93; 725/142; 725/153
(58) Field of Classification Search .......... 709/203, 709/219, 226, 231; 725/54, 55, 88, 89, 90, 725/93, 142, 153
See application file for complete search history.

(56) References Cited

U.S. PATENT DOCUMENTS

| | | | | |
|---|---|---|---|---|
| 5,754,784 | A | * | 5/1998 | Garland et al. .............. 709/219 |
| 6,151,634 | A | * | 11/2000 | Glaser et al. ................ 709/236 |
| 6,857,130 | B2 | * | 2/2005 | Srikantan et al. ............. 725/93 |
| 7,107,606 | B2 | * | 9/2006 | Lee .............................. 725/87 |
| 7,127,735 | B1 | | 10/2006 | Lee et al. |
| 7,386,874 | B2 | * | 6/2008 | White et al. ................. 725/134 |

(Continued)

FOREIGN PATENT DOCUMENTS

EP    1 594 317    11/2005

(Continued)

OTHER PUBLICATIONS

Search Report from European Patent Office in related Application No. 08 25 2557 dated Sep. 3, 2009 (4 pages).

*Primary Examiner*—Michael Won
(74) *Attorney, Agent, or Firm*—Finnegan, Henderson, Farabow, Garrett & Dunner LLP

(57) ABSTRACT

A content playback device has a processor, a memory, a data acquisition portion that acquires streaming data for content from a data transmission device, and a storage portion that stores the acquired streaming data in a storage medium. The content playback device also has a playback portion that plays back the content based on the stored streaming data, a playback control portion that causes the playback portion to halt playback of the content in response to a halt playback request, and an acquisition control portion. The acquisition control portion causes the data acquisition portion to stop acquisition of the streaming data in response to the halt playback request, and causes the data acquisition portion to restart acquisition of the streaming data in response to a resume playback request. The storage portion stores, in the storage medium, the streaming data acquired in response to the resume playback request, starting from a position at which acquisition of the streaming data was stopped.

20 Claims, 12 Drawing Sheets

U.S. PATENT DOCUMENTS

| | | | |
|---|---|---|---|
| 7,644,172 B2 * | 1/2010 | Stewart et al. | 709/231 |
| 2001/0044851 A1 * | 11/2001 | Rothman et al. | 709/231 |
| 2002/0099798 A1 * | 7/2002 | Fedorovsky et al. | 709/219 |
| 2003/0037331 A1 | 2/2003 | Lee | |
| 2004/0034870 A1 * | 2/2004 | O'Brien et al. | 725/88 |
| 2005/0028197 A1 | 2/2005 | White et al. | |
| 2007/0283035 A1 * | 12/2007 | Wang | 709/231 |
| 2009/0037596 A1 * | 2/2009 | Math et al. | 709/231 |
| 2009/0204719 A1 * | 8/2009 | Simongini et al. | 709/231 |
| 2009/0204842 A1 * | 8/2009 | Tetik et al. | 713/400 |

FOREIGN PATENT DOCUMENTS

| | | |
|---|---|---|
| EP | 2 086 235 | 8/2009 |
| JP | 09-037225 | 2/1997 |
| WO | WO 2004/034689 | 4/2004 |

* cited by examiner

RTP PACKET

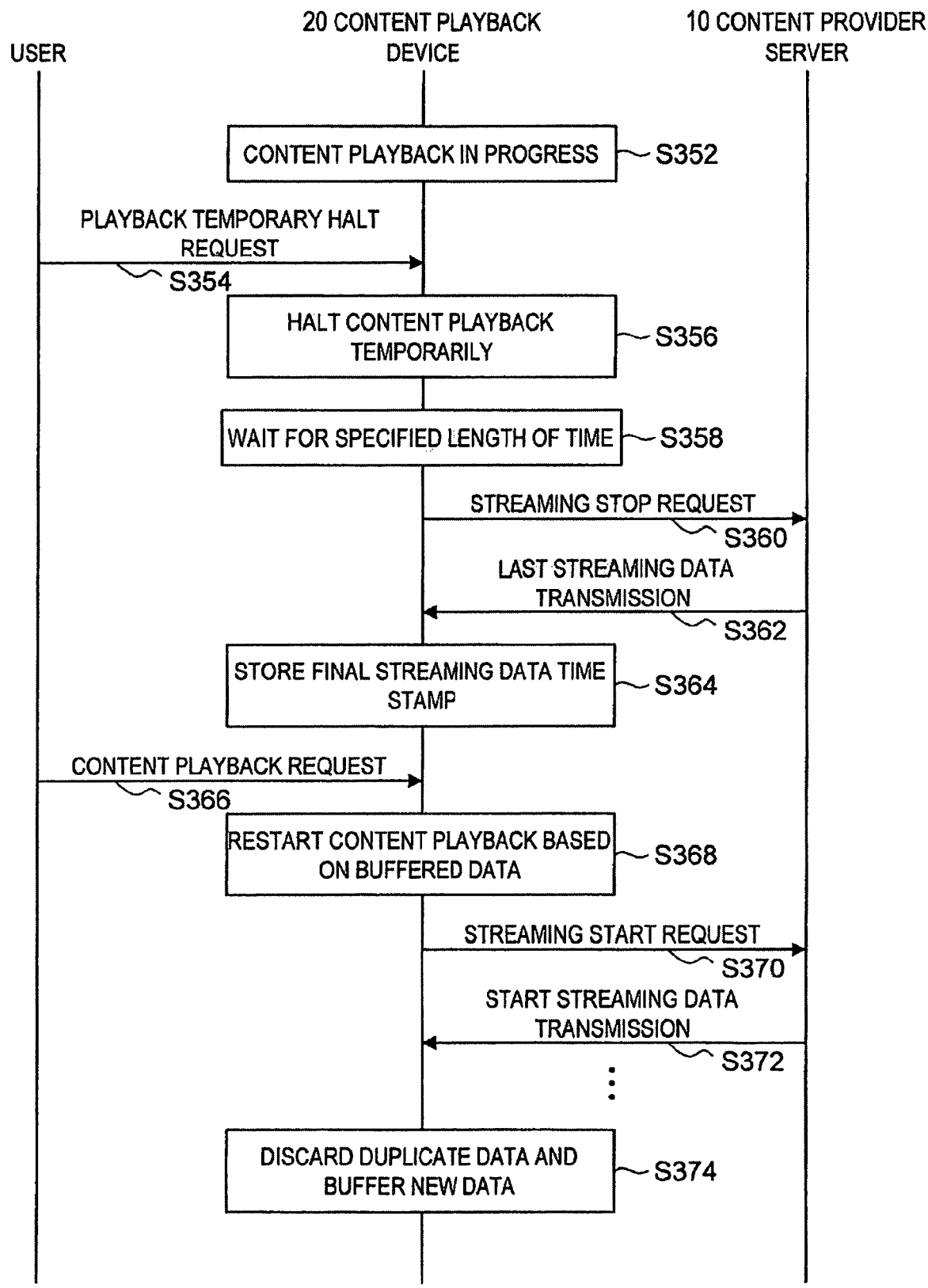

CONTENT PLAYBACK DEVICE, CONTENT PLAYBACK METHOD, COMPUTER-READABLE STORAGE MEDIUM, AND CONTENT PLAYBACK SYSTEM

CROSS REFERENCE

This application contains subject matter related to Japanese Patent Application JP 2007-206737, filed in the Japanese Patent Office on Aug. 8, 2007, the contents of which are incorporated herein by reference.

TECHNICAL FIELD

The present invention relates to a content playback device, a content playback method, a program, and a content playback system.

BACKGROUND INFORMATION

In recent years, services in which a content provider server transmits content to a user terminal through an Internet protocol (IP) network have become popular. For example, Japanese Patent Application Publication No. JP-A-9-37225 describes a service in which a content provider server distributes moving image information to a terminal through a communication network. The service is a download service or a streaming service (e.g., a video-on-demand streaming service).

When using the download service, the user terminal begins playback of the content after the moving image information is received from the content provider server. In contrast, when using the streaming service, the content provider server transmits streaming data to the user terminal in response to a user request. As the streaming data is transmitted, the user terminal plays back the content corresponding to streaming data that has been received. The user can send a request to the content provider server to fast forward the content, temporarily halt playback of the content (e.g., pause or stop), play the content at a variable speed, and/or other perform other playback operations.

However, continuity is not guaranteed between the streaming data transmitted to the user terminal before and after a temporary halt. When the user terminal resumes playback after the temporary halt, problems such as rewinding the content (i.e., playing back the content from a prior point) and disruption of the video and audio may occur.

SUMMARY

The present disclosure addresses these problems, and provides a content playback device, a content playback method, a computer-readable storage medium, and a content playback system capable of maintaining continuity between content played back before and after the temporary halt.

One aspect of the disclosure is directed to a content playback device. The content playback device may include a data acquisition portion that acquires streaming data for content from a data transmission device, and a storage portion that stores the acquired streaming data in a storage medium. The content playback device may further include a playback portion that plays back the content based on the stored streaming data, a playback control portion that causes the playback portion to halt playback of the content in response to a halt playback request, and an acquisition control portion. The acquisition control portion may cause the data acquisition portion to stop acquisition of the streaming data in response to the halt playback request, and may cause the data acquisition portion to restart acquisition of the streaming data in response to a resume playback request. The storage portion may store, in the storage medium, the streaming data acquired in response to the resume playback request, starting from a position at which acquisition of the streaming data was stopped.

Another aspect of the disclosure is directed to a content playback method. The method may include acquiring streaming data for content from a data transmission device, storing the streaming data in a storage medium, and playing back the content based on the stored streaming data. The method may further include halting playback of the content in response to a halt playback request, stopping acquisition of the streaming data in response to the halt playback request, and restarting acquisition of the streaming data in response to a resume playback request. The method may further include storing, in the storage medium, the streaming data acquired in response to the resume playback request starting from a position at which acquisition of the streaming data was stopped.

Another aspect of the disclosure is directed to a computer-readable storage medium storing a computer program which, when executed by a content playback device, causes the content playback device to perform a content playback method. The method may include acquiring streaming data for content from a data transmission device, storing the streaming data in a storage medium, and playing back the content based on the stored streaming data. The method may further include halting playback of the content in response to a halt playback request, stopping acquisition of the streaming data in response to the halt playback request, and restarting acquisition of the streaming data in response to a resume playback request. The method may further include storing, in the storage medium, the streaming data acquired in response to the resume playback request starting from a position at which acquisition of the streaming data was stopped.

Yet another aspect of the disclosure is directed to a content playback system including a data transmission device that transmits streaming data for content, and a content playback device that plays back the content based on the streaming data. The content playback device may include a memory, a processor, a data acquisition portion that acquires the streaming data from the data transmission device, and a storage portion that stores the acquired streaming data in a storage medium. The content playback device may further include a playback portion that plays back the content based on the stored streaming data, a playback control portion that causes the playback portion to halt playback of the content in response to a halt playback request, and an acquisition control portion. The acquisition control portion may causes the data acquisition portion to stop acquisition of the streaming data in response to the halt playback request, and may cause the data acquisition portion to restart acquisition of the streaming data in response to a resume playback request. The storage portion may store, in the storage medium, the streaming data acquired in response to the resume playback request starting from a position at which acquisition of the streaming data was stopped.

BRIEF DESCRIPTION OF THE DRAWINGS

The accompanying drawings, which are incorporated in and constitute a part of this specification, show certain aspects of implementations consistent with the present invention and, together with the description, help explain principles associated with the invention.

FIG. 14 illustrates a flowchart depicting another content playback method implemented in the content playback system.

DETAILED DESCRIPTION

Figure 1:
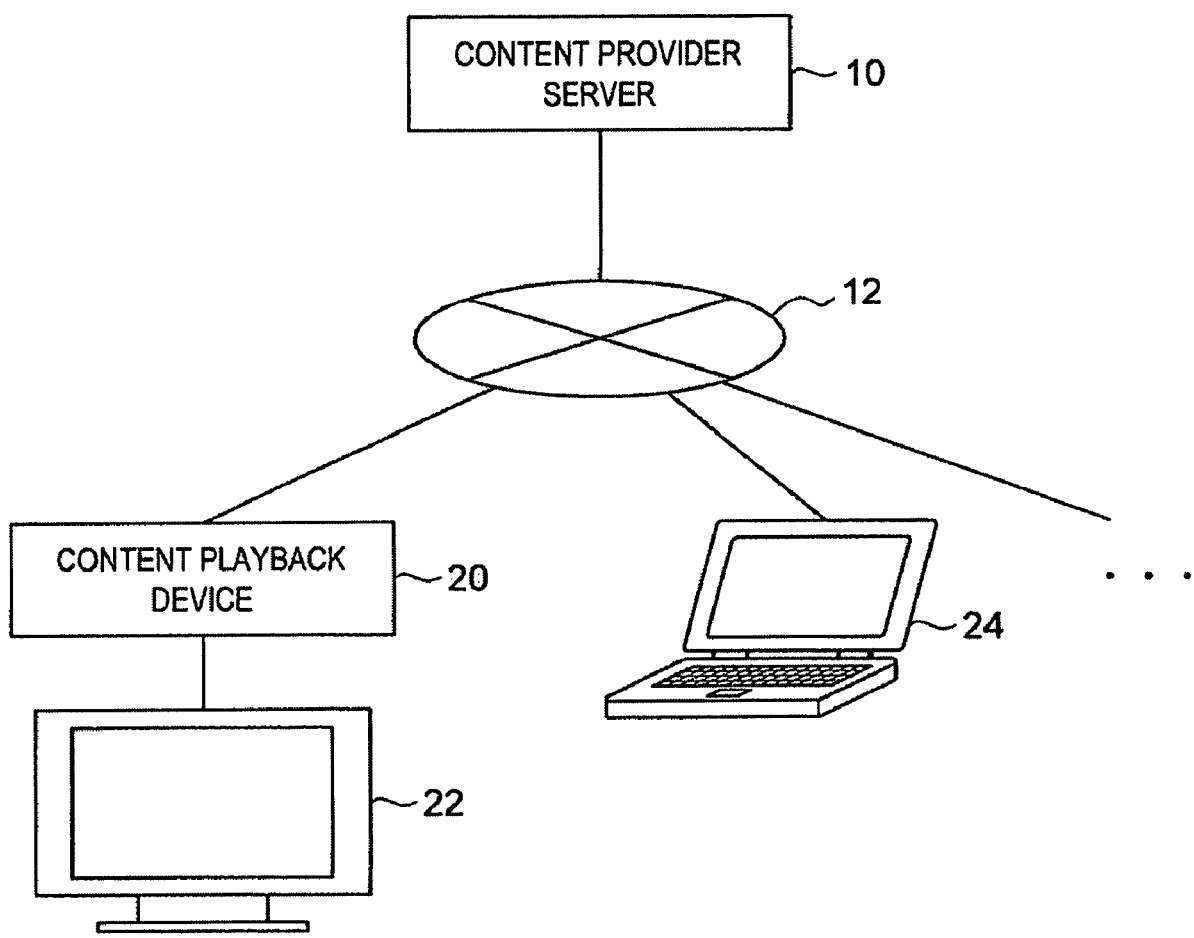
FIG. 1 illustrates an exemplary disclosed content playback system.

The following detailed description refers to the accompanying drawings. Wherever possible, the same reference numbers are used in the drawings and the following description to refer to the same or similar parts.

While several exemplary embodiments and features are described herein, modifications, adaptations and other implementations are possible, without departing from the spirit and scope of the description. For example, substitutions, additions or modifications may be made to the components illustrated in the drawings, and the exemplary methods described herein may be modified by substituting, reordering or adding steps to the disclosed methods. Accordingly, the following detailed description is not intended to be limiting. Instead, the proper scope is defined by the appended claims.

FIG. 1 shows a configuration of an exemplary disclosed content playback system 1. Content playback system 1 may include a content provider server 10, a content playback device 20, a display device 22, and a personal computer 24.

The content provider server 10 may store content data and transmit streaming content data to the content playback device 20 and/or the personal computer 24 in response to a request therefrom. The content playback device 20 and the personal-computer 24 may be connected to the content provider server 10 through a communication network 12. The content provider server 10 may also store and transmit, in addition to streaming data for ordinary playback of the content, streaming data for variable speed playback of the content (e.g., two times the ordinary speed, ten times the ordinary speed, and thirty times the ordinary speed).

The content may include audio data such as music, a lecture, a radio program, or the like; video data such as a motion picture, a television program, a video program, a photograph, a document, a painting, a chart, or the like; and miscellaneous data such as a game, software, or the like.

The communication network 12 may include a fixed line cable such as a copper wire, an optical fiber, and/or another wired connection; a wireless data transmission path such as radio waves and/or other electromagnetic radiation; and a data relay unit, such as a router, a base station for controlling communications, and/or another communication device. The communication network 12 may be an Internet Protocol (IP) network or another packet-switched network.

The content playback device 20 may perform a variety of processing in response user requests. For example, in response, to a content playback request from the user, the content playback device 20 may send a request to the content provider server 10 to transmit streaming data for the content, and receive the streaming data from the content provider server 10. The content playback device 20 may then play back the content based on the received streaming data as audio and/or video output through display device 22.

FIG. 1 shows the content playback device 20 and the display device 22 arranged separately. However, the content playback device 20 and the display device 22 may alternatively be configured as a single unit, such as in the case of personal computer 24, for example. The configurations shown in FIG. 1 are not intended to be limiting. For example, the content playback device 20 and the personal computer 24 may each be a home video processing device (e.g., a DVD recorder, a video deck, or the like), a mobile telephone, a Personal Handyphone System (PHS), a mobile audio device, a mobile image processing device, a personal digital assistant (PDA), a home gaming device, a mobile game device, a home appliance, or another information processing device.

Figure 2:
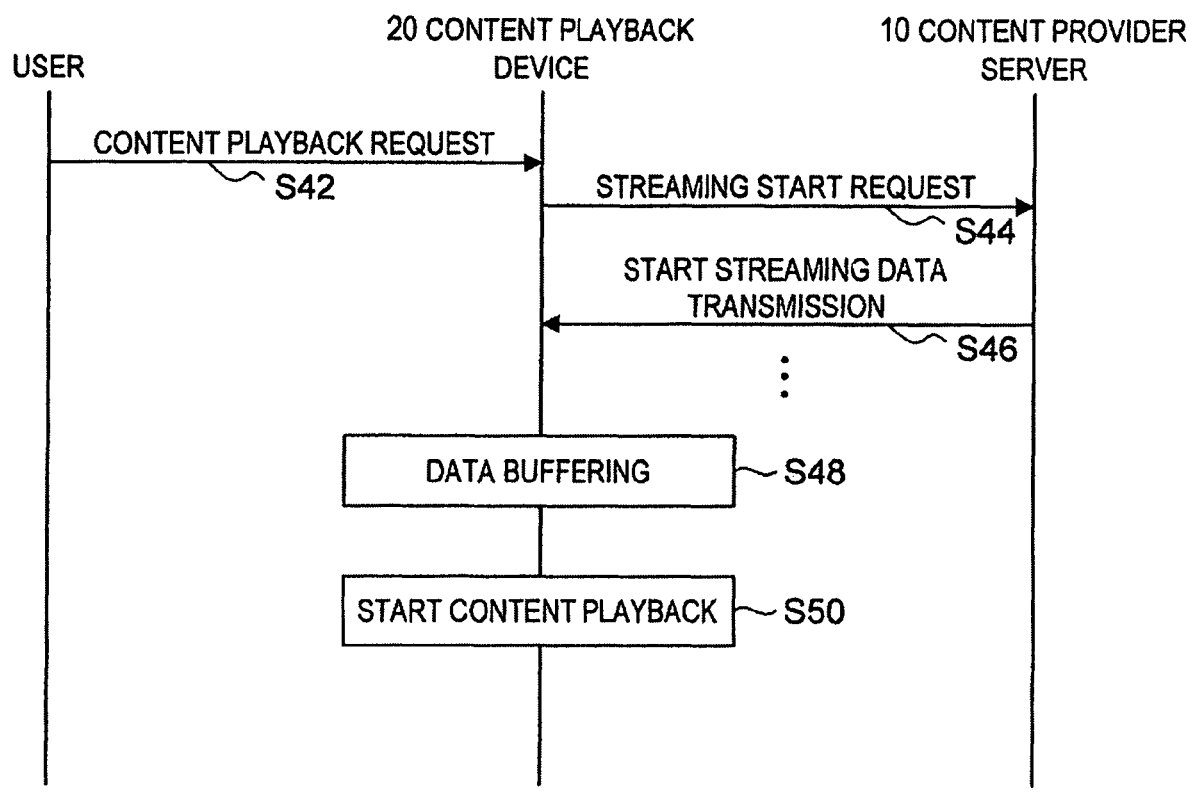
FIG. 2 illustrates a flow chart depicting content playback in the content playback system.

FIG. 2 illustrates a flowchart depicting content playback in the content playback system 1.

First, a content playback request may be input by the user to the content playback device 20 via a remote control, for example (step S42). The content playback device 20 may then send a request (a streaming start request) to the content provider server 10 to start transmission of the streaming data for the content (step S44).

In response to the streaming start request, the content provider server 10 may start transmission of the streaming data to the content playback device 20 (step S46). The content playback device 20 may buffer the streaming data received from the content provider server 10 (step S48).

Once the content playback device 20 has buffered a sufficient amount of the streaming data to start playback of the content, the content playback device 20 may start playback of the content, based on the buffered streaming data (step S50). Thus, the content playback device 20 can play back the content while receiving the streaming data, and without waiting until all of the streaming data for the content to be received.

Figure 3:
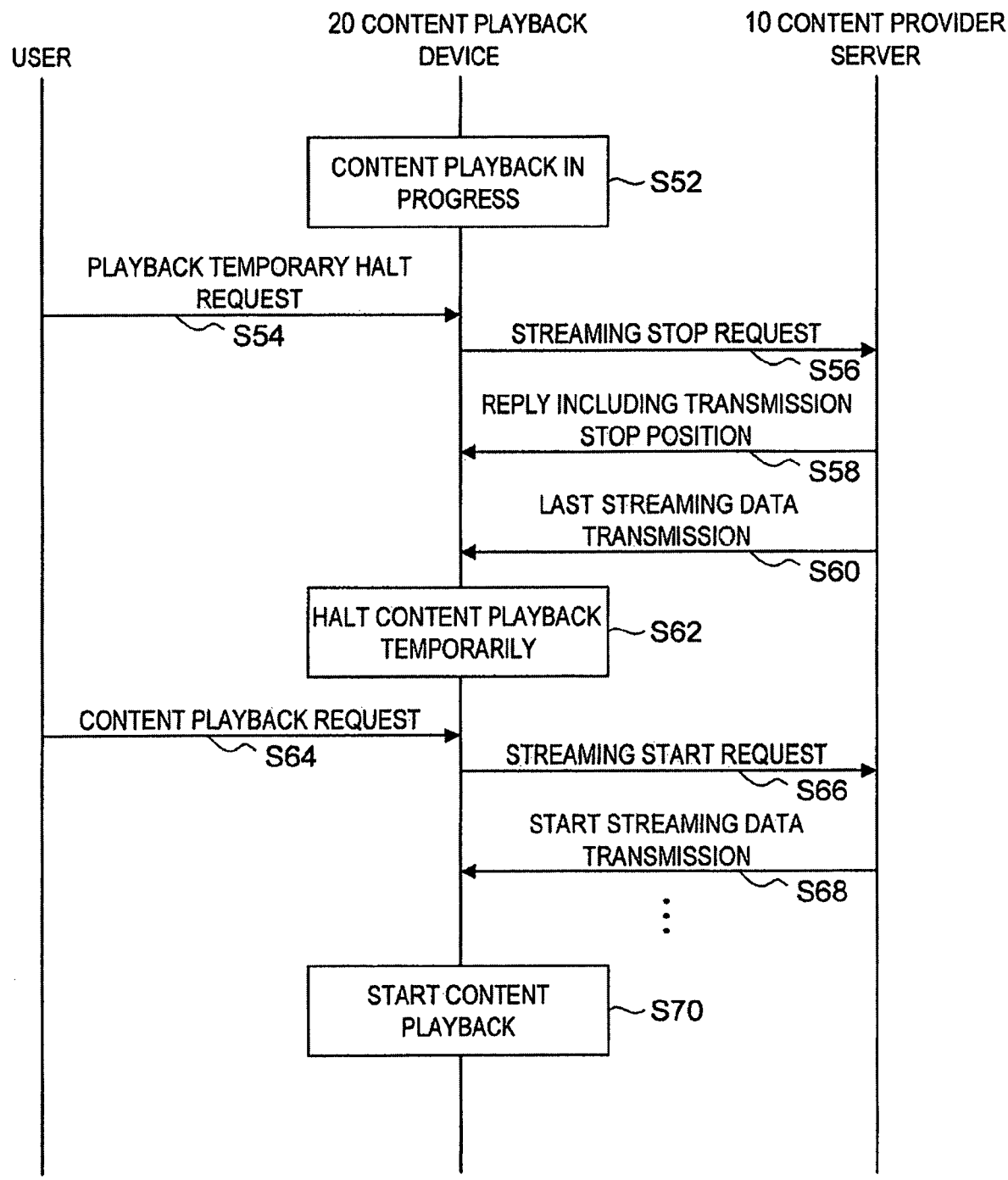
FIG. 3 illustrates a flowchart depicting halting and restarting content playback in the content playback system.

FIG. 3 illustrates a flowchart depicting temporarily halting and restarting playback of the content. As the content playback device 20 plays back the content while receiving the streaming data from the content provider server 10 (step S52), a temporary halt (e.g., pause, stop, etc.) of the playback may be requested by the user, such as through a remote control (step S54).

In response to the temporary halt request, the content playback device 20 may send a request (a streaming stop request) to the content provider server 10 to stop transmission of the streaming data (step S56). The content provider server 10 may then stop transmission of the streaming data and transmit to the content playback device 20 a reply indicating that the streaming stop request has been received (step S58). Next, the last of the streaming data transmitted from the content provider server 10 may arrive at the content playback device 20 (step S60).

When the content playback device 20 receives the last of the streaming data, the content playback device 20 may temporarily halt playback of the content (step S62). Subsequently, when a content playback request is input to the content playback device 20 by the user to start (i.e., resume) playback of the content (step S64), the content playback device 20 may send a request (the streaming start request) to the content provider server 10 to start the transmission of the streaming data (step S66).

In response to the streaming start request, the content provider server 10 may start transmission of the streaming data to the content playback device 20 (step S68). The content playback device 20 may buffer the streaming data received from the content provider server 10.

Upon buffering a sufficient amount of the streaming data to start playback of the content, the content playback device 20 may start (i.e., resume) playback, based on the buffered streaming data (step S70). Thus, the content playback device 20 can stop the acquisition of the streaming data in response to the request from the user to halt playback temporarily, and can restart acquisition of the streaming data in response to the playback request (i.e., resume playback).

Figure 4:
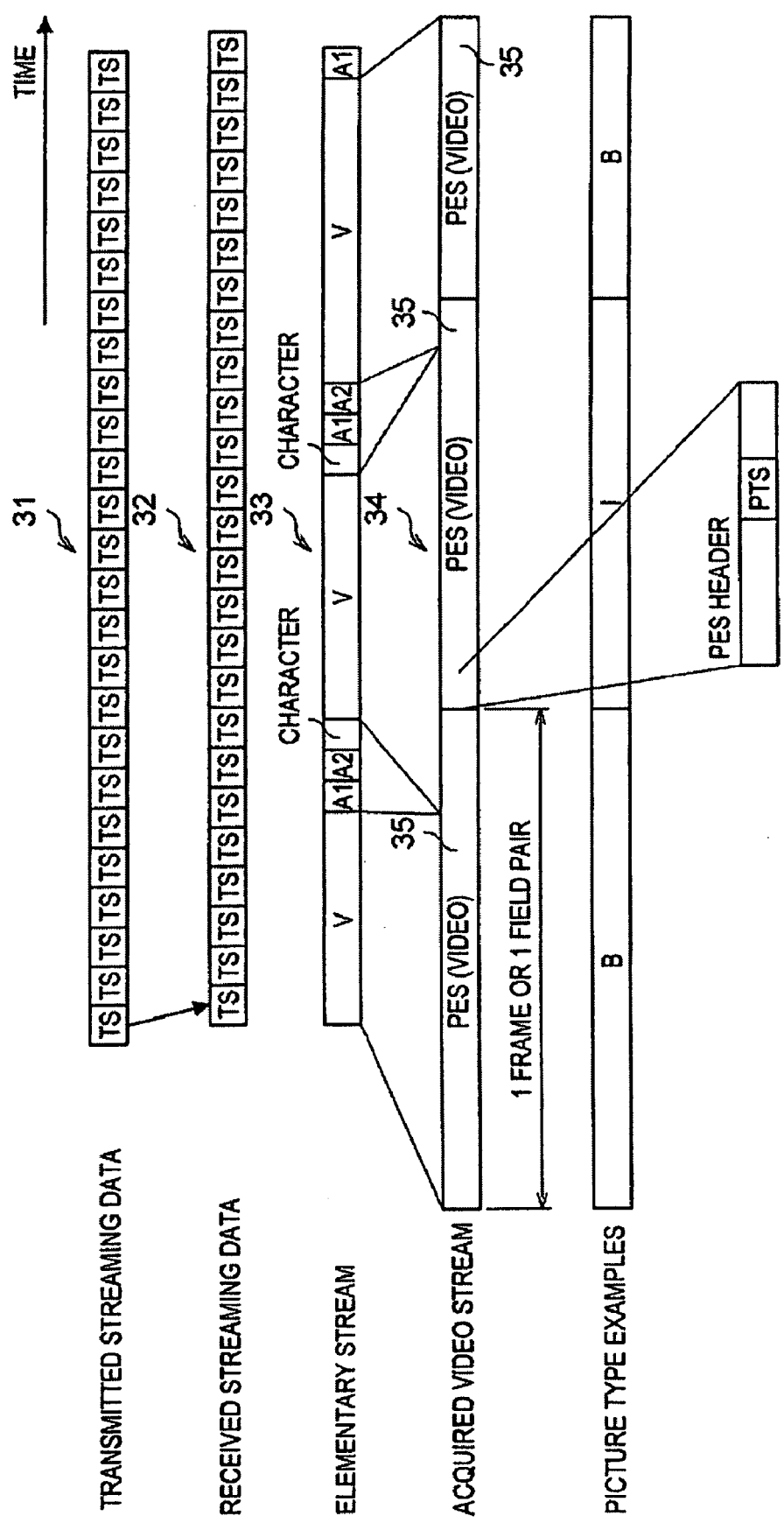
FIG. 4 illustrates a relationship between streaming data and a Packetized Elementary Stream (PES)

FIG. 4 illustrates a relationship between the streaming data and a Packetized Elementary Stream (PES). As shown by FIG. 4, the streaming data may include streaming data 31 as transmitted by the content provider server 10, and streaming data 32 as received by the content playback device 20.

The transmitted streaming data 31 and the received streaming data 32 may comprise a plurality of transport stream (TS) packets. The TS packets may contain data for a variety of types of media, such as video data, audio data, closed caption data, and the like. Each TS packet may also contain a time stamp (a TTS) that indicates the time at which the TS packet was transmitted from the content provider server 10. The time stamp may be a count value incremented at a frequency of 27 MHz, for example. A content playback time, as well as a sequence of the TS packets, may be determined based on the time stamp.

It is to be appreciated that after the content provider server 10 transmits the streaming data 31, a delay may occur before the streaming data 32 is received by content playback device 20. The delay is indicated by the offset between the transmitted streaming data 31 and the received streaming data 32 along the time axis shown in FIG. 4.

FIG. 4 also shows an Elementary Stream (ES) 33 that may be derived from each TS packet that makes up the streaming data 31, 32. A Packetized Elementary Stream (PES) 34 may be generated by dividing the ES 33 in variable-length PES blocks 35 and appending header information to the PES blocks 35.

The information appended to the PES blocks 35 may contain Presentation Time Stamp (PTS) information. The PTS information may indicate a calculated time between a specified base point and a point at which the particular PES block 35 is displayed. FIG. 4 also shows examples of picture types for the PES blocks 35. The picture types may include, for example, a B picture, an I picture, or a P picture.

Conventionally, after a temporary halt (e.g., a pause or stop) in the content playback, the content playback device 20 may receive streaming data from the content provider server 10 that is discontinuous with the streaming data that acquired before the temporary halt.

Figure 5:
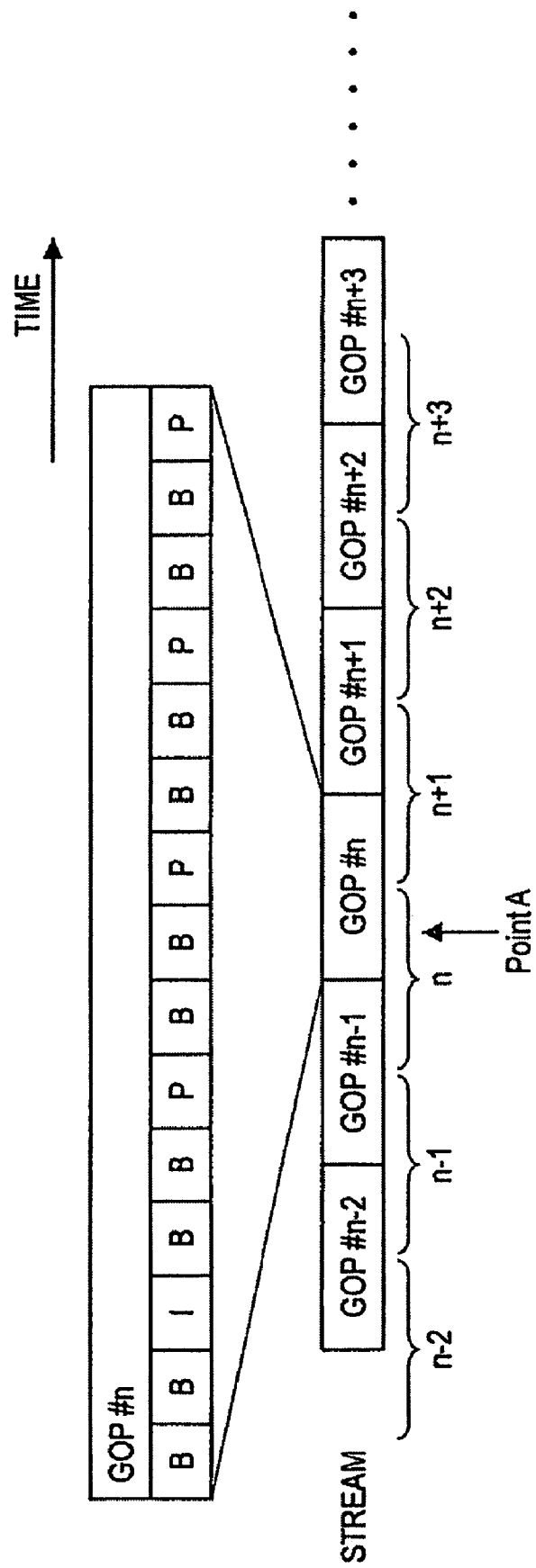
FIG. 5 illustrates acquisition of the streaming data by a content playback device.

FIG. 5 illustrates acquisition of the streaming data by the content playback device 20 after the temporary halt. The content playback device 20 may send a request to the content provider server 10 to transmit subsequent streaming data, based on the TTS and the PTS information, for example.

In some cases, however, the content provider server 10 may restart transmission of the streaming data from the beginning of a Group of Pictures (GOP) closest to the position at which the content playback device 20 requested that transmission be restarted. For example, if the content playback device 20 requests that transmission of the streaming data restart from point A, as shown in FIG. 5, the content provider server 10 may restart the transmission of the streaming data from the beginning of the GOP #n.

Therefore, even though the content playback device 20 may have received the streaming data up to a certain point A within the GOP #n, the content playback device 20 may receive streaming data for all of GOP #n after playback is resumed (i.e., after the temporary halt). That is, content playback device 20 may receive redundant streaming data for GOP #n received prior to point A. Therefore, when content playback device 20 restarts playback of the content after the temporary halt, the content may be rewound (i.e., played back from a prior point) or the audio and video may be disrupted, which can be frustrating to the user.

The disclosed content playback device 20 may remedy these problems. When playback restarts after a temporary halt, the content playback device 20 may prevent playback of the content from a point before the temporary halt. That is, the content playback device 20 may prevent playback of the content from a point before point A.

Figure 6:
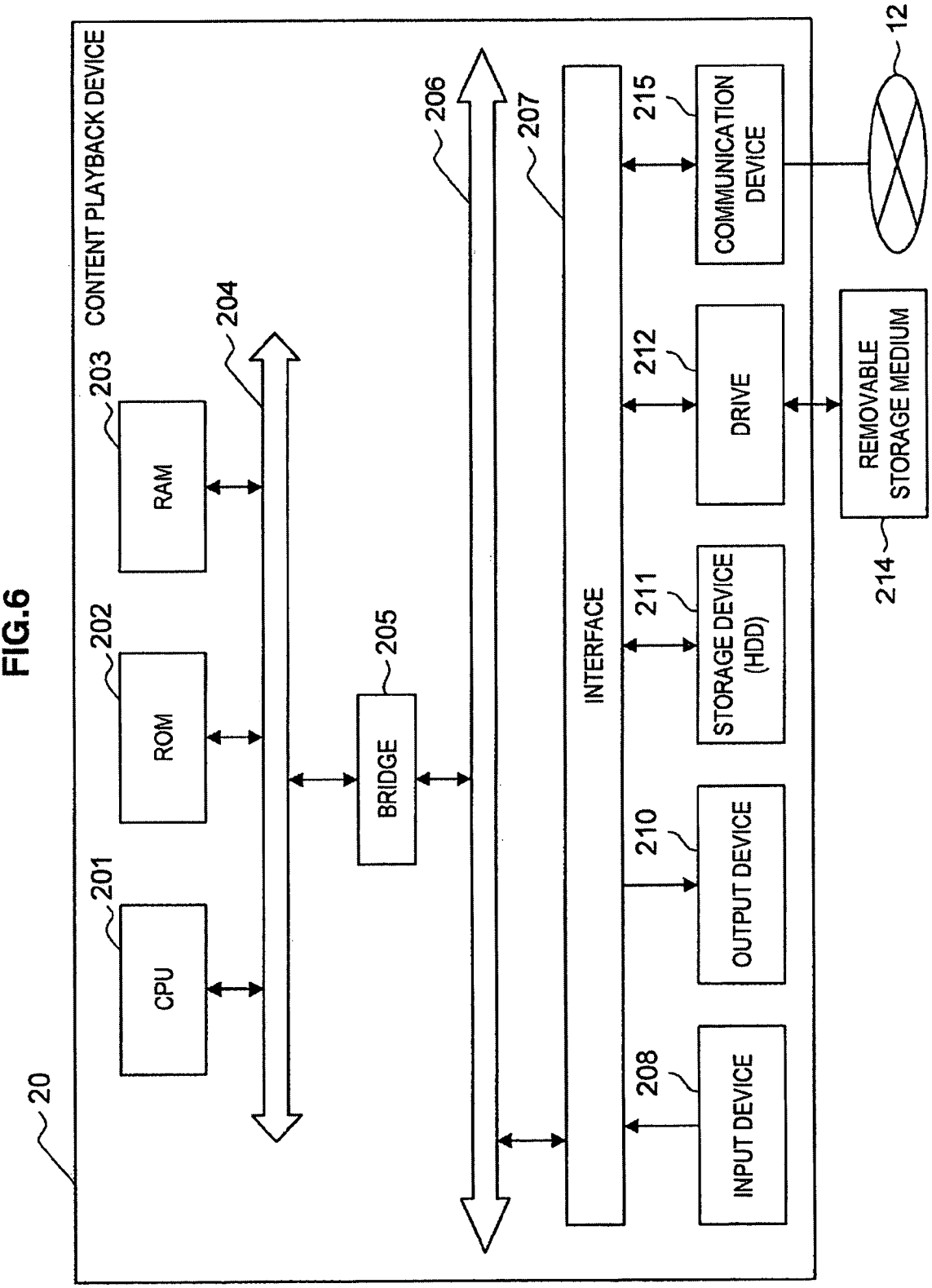
FIG. 6 illustrates a hardware configuration of the content playback device.

FIG. 6 illustrates a hardware configuration of the content playback device 20. The content playback device 20 may include a central processing unit (CPU) 201, a read only memory (ROM) 202, a random access memory (RAM) 203, a host bus 204, a bridge 205, an external bus 206, an interface 207, an input device 208, an output device 210, a storage device (HDD) 211, a drive 212, and a communication device 215.

The CPU 201 may be a computational processing device that controls operations of the content playback device 20, such as a microprocessor. The ROM 202 may store programs, instructions, computational parameters, and/or other data for use by CPU 201. The RAM 203 may store the programs currently being executed by the CPU 201, as well as parameters and other data that may be modified or used during the execution of the programs. The CPU 201, the ROM 202, and the RAM 203 may be interconnected by the host bus 204, which may configured from a CPU bus or the like.

The host bus 204 may be connected through the bridge 205 to the external bus 206. External bus 206 may be, for example, a Peripheral Component Interconnect (PCI) bus or another suitable interface. It may not be necessary for the host bus 204, the bridge 205, and the external bus 206 to be configured separately, as shown by FIG. 6. For example, the functions of the host bus 204, the bridge 205, and the external bus 206 may be incorporated into a single bus.

The input device 208 may be a mouse, a keyboard, a touch panel, a button, a microphone, a switch, a lever, a remote control, and/or another user input device for inputting information. Input device 208 may generate an input signal based on the user input, and may output the signal to the CPU 201. By operating the input device 208, the user can provide input to commands to control the operations of the content playback device 20.

The output device 210 may include, for example, a display device and an audio output device. The display device may be a cathode ray tube (CRT) display device, a liquid crystal display (LCD) device, an organic light emitting display (OLED) device, a lamp, or another display device. The audio output device may be a speaker, a headphone, or another audio device. The output device 210 may output the played back content. Specifically, the display device may display, in the form of text and images, display data contained in the played back content (e.g., video data). The audio output device may convert audio data contained in the played back data to sound and may output the sound.

The storage device 211 may be any device configured to store data, programs, and/or other information used by the CPU 201. The storage device 211 may include a storage medium, a recording device that records data to the storage medium, a readout device that reads data from the storage medium, a deletion device that deletes the data recorded in the storage medium, and/or other components. For example, storage device 211 be a hard disk drive (HDD) or another suitable mass data storage device. The streaming data may be stored in the storage device 211.

The drive 212 may be a reader/writer device for a removable storage medium 214. The drive 212 may be built into or externally attached to the content playback device 20. The drive 212 may read out and output to the RAM 203 information stored in the removable storage medium 214. The removable storage medium may be a magnetic disk, an optical disk, a magneto-optical disk, a semiconductor memory, another computer-readable storage device that can be selectively connected to content playback device 20.

The communication device 215 may include any device for communicating through the communication network 12. For example, the communication device 215 may be a wireless local area network (LAN) communication device, a wireless USB communication device, a wired communication device configured to communicate over a fixed line, another suitable communication device. The communication device 215 may transmit and receive the streaming data, various types of requests, and/or other information to and from the content provider server via the communication network 12.

The hardware configuration of the content provider server 10 may be substantially the same as that of the content playback device 20, and a description of the hardware configuration of the content provider server 10 is therefore omitted.

Figure 7:
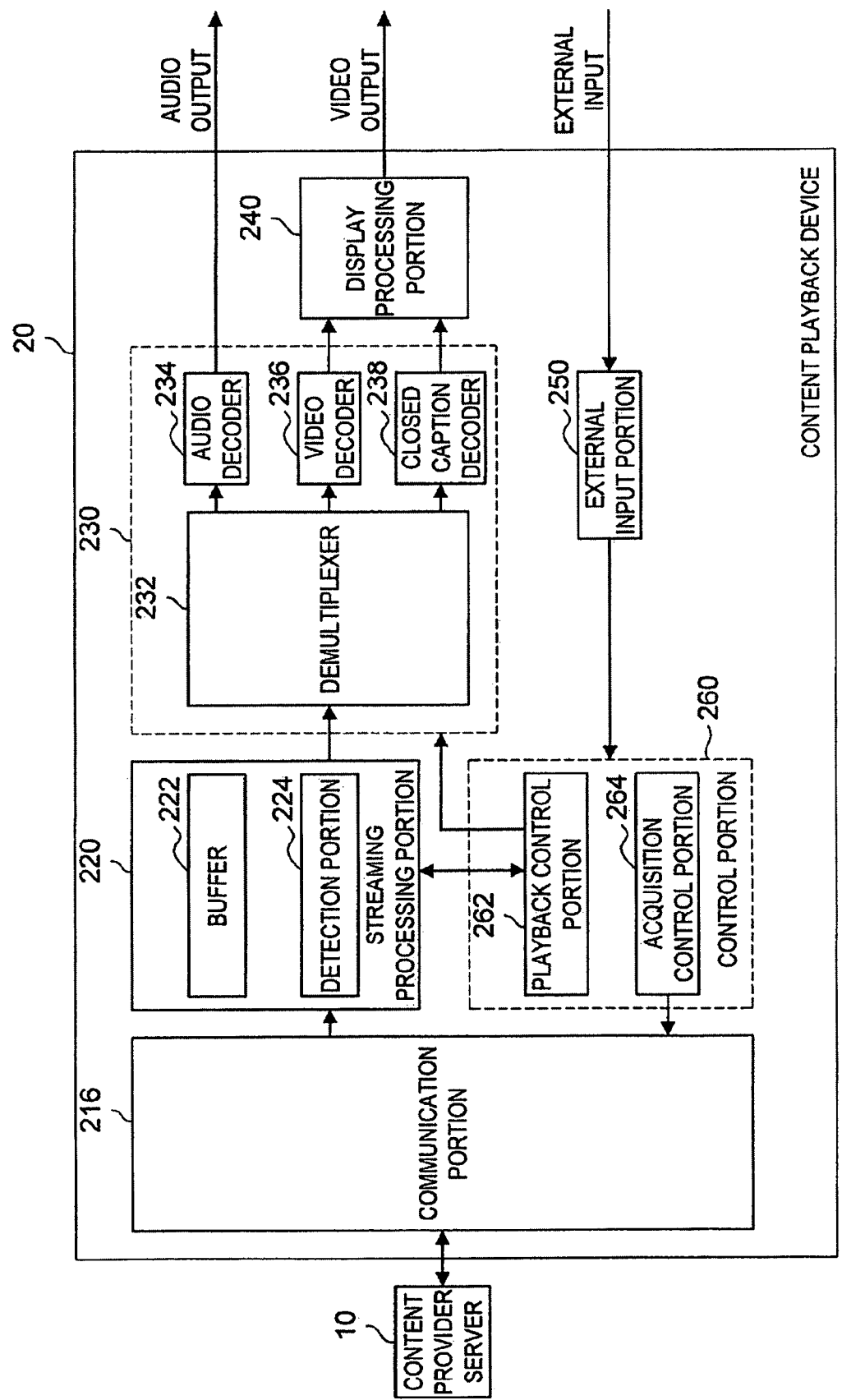
FIG. 7 illustrates-functional block diagram of the content playback device.

FIG. 7 illustrates a functional block diagram of the content playback device 20. The content playback device 20 may include a communication portion 216, a streaming processing portion 220, a playback portion 230, a display processing portion 240, an external input portion 250, and a control portion 260.

The communication portion 216 may interface with the content provider server 10. Operation of the communication portion 216 may be controlled by an acquisition control portion 264 of the control portion 260. In accordance with the control by the acquisition control portion 264, the communication portion 216 may send a request to the content provider server 10 for the streaming data, and may receive the streaming data from the content provider server 10. The communication portion 216 may perform communications using, for example, Hypertext Transfer Protocol (HTTP), Real-time Transport Protocol (RTP), Transmission Control Protocol (TCP), User Datagram Protocol (UDP), Internet Protocol (IP), and/or other suitable communication protocols.

The streaming processing portion 220 may store the streaming data received from the communication portion 216 in a buffer 222. The streaming processing portion 220 may also supply the buffered streaming data to the playback portion 230, according to an appropriate timing.

For example, the streaming processing portion 220 may start to supply the streaming data to the playback portion 230 when a sufficient amount if streaming data is stored in the buffer 222 (e.g., about half of the storage capacity of the buffer 222, or another amount that will not cause overflow or underflow of the buffer 222). The streaming processing portion 220 may also perform packet error correction of the received streaming data.

The streaming processing portion 220 may also include a detection portion 224. When the playback restarts (i.e., resumes) after a temporary halt, the detection portion 224 may detect that the communication portion 216 has received streaming data continuous with the streaming data buffered in the buffer 222 at the time of the temporary halt.

The playback portion 230 may include a demultiplexer 232, an audio decoder 234, a video decoder 236, and a closed caption decoder 238.

The demultiplexer 232 may determine whether each TS packet included in the streaming data supplied from the streaming processing portion 220 is an audio packet, a video packet, or a closed caption packet. The demultiplexer 232 may output the audio TS packet as an audio ES to the audio decoder 234, and may output the video TS packet as a video ES to the video decoder 236. The demultiplexer 232 may also output the closed caption TS packet to the closed caption decoder 238.

The audio decoder 234 may decode the audio ES and generate a corresponding audio signal. The audio ES may be encoded according to an audio compression format such as MPEG1 Audio Layer 3 (MP3), Advanced Audio Coding (AAC), linear PCM (LPCM), Windows Media Audio 9 (WMA9), Adaptive Transform Acoustic Coding (ATRAC), ATRAC3, or another audio compression format.

The video decoder 236 may decode the video ES and generate a corresponding video signal. The video ES may be encoded according to an image compression format such as Moving Picture Experts Group 1 (MPEG1), MPEG2, MPEG4, or another video compression format. The closed caption decoder 238 may decode the closed caption ES and generate a corresponding closed caption signal.

The playback portion 230 may implement variable-speed playback of the content at a speed n times the normal playback speed. Variable-speed playback may involve substantially the same processing as that used for the streaming data for normal speed playback.

The display processing portion 240 may superimpose the closed caption signal on the video signal and output the superimposed signals.

The external input portion 250 may be a user interface through which various types of requests and commands to the content playback device 20 may be input by the user. For example, a signal transmitted from a remote control in response to user input (e.g., a command, a request, etc.) may be provided to the external input portion 250. The external input portion 250 may output to the control portion 260 a signal indicative of the user input. Types of requests or commands by the user may include a content playback request, a temporary halt request (e.g., pause or stop), a fast forward request, a rewind request, a variable speed playback request, a reverse playback requests, and the like.

As shown by FIG. 7, the control portion 260 may include a playback control portion 262 and the acquisition control portion 264.

The playback control portion 262 may control the streaming processing portion 220 and the playback portion 230 based on a signal input from the external input portion 250. For example, if a request to temporarily halt content playback is input from the external input portion 250, the playback control portion 262, at a specified time, may stop the streaming processing portion 220 from supplying the streaming data to the playback portion 230.

The acquisition control portion 264 may control the communication portion 216 based on a signal input from the streaming processing portion 250. For example, if a request to play back the content is input from the external input portion 250, the acquisition control portion 264 may cause the communication portion 216 to send a request to the content provider server 10 to transmit the streaming data. If a request to temporarily halt the content playback is input from the external input portion 250, the acquisition control portion 264 may cause the communication portion 216 to send a request to the content provider server 10 to stop transmission of the streaming data.

If variable-speed playback is requested by the user, the acquisition control portion 264 may cause the communication portion 216 to send a request to the content provider server 10 to transmit streaming data for variable-speed playback at the speed designated by the user. In response to the request, streaming data for variable-speed playback at the designated speed, or at a speed proportionate to the designated speed, may be transmitted by the content provider server 10. For example, if variable-speed playback at 8-times the normal speed is requested, streaming data for variable speed playback at 8- or 10-times the normal speed may be transmitted.

Figure 8:
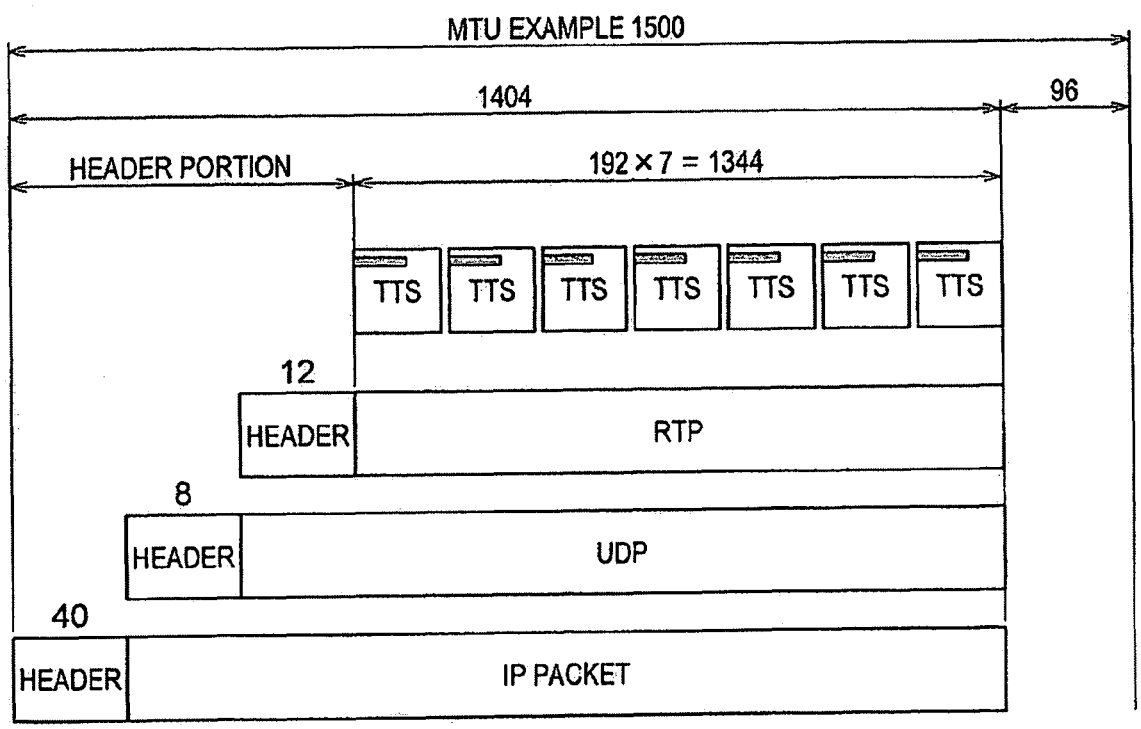
FIG. 8 illustrates an exemplary Maximum Transmission Unit (MTU) of streaming data transmitted from a content provider server.

FIG. 8 illustrates an exemplary Maximum Transmission Unit (MTU) of the streaming data transmitted from the content provider server 10. The MTU may include a plurality of the TS packets, an RTP header, a UDP header, and an IP packet.

Each of the TS packets may carry the time stamp (TTS), described above, at its leading end. The TTS may contain 4 bytes, for example.

Figure 9:
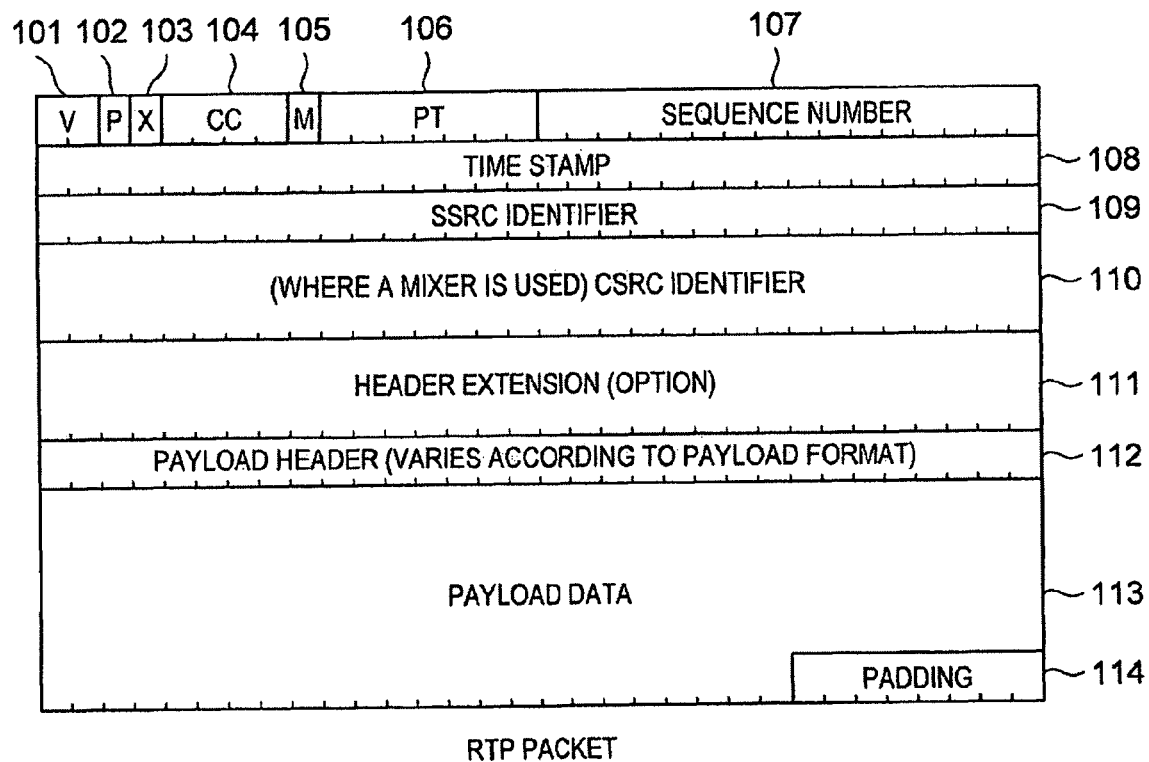
FIG. 9 illustrates an exemplary configuration of a Real-time Transport Protocol (RTP) packet.

FIG. 9 illustrates an exemplary configuration of a Real-time Transport Protocol (RTP) packet. The RTP packet may contain version information (V) 101, padding information (P) 102, extension information (X) 103, CSRC count information (C) 104, marker information (M) 105, payload type information (PT) 106, a sequence number 107, a time stamp 108, and an SSRC identifier 109.

The SSRC identifier 109 may be information for identifying a session of the streaming data. For example, an SSRC identifier 109 contained in streaming data received by the content playback device 20 before a temporary halt may have a different value than an SSRC identifier 109 contained in the streaming data received by the content playback device 20 after the temporary halt.

The RTP packet may also contain a CSRC identifier 110, a header extension 111, a payload header 112, payload data 113, and padding 114.

Figure 10:
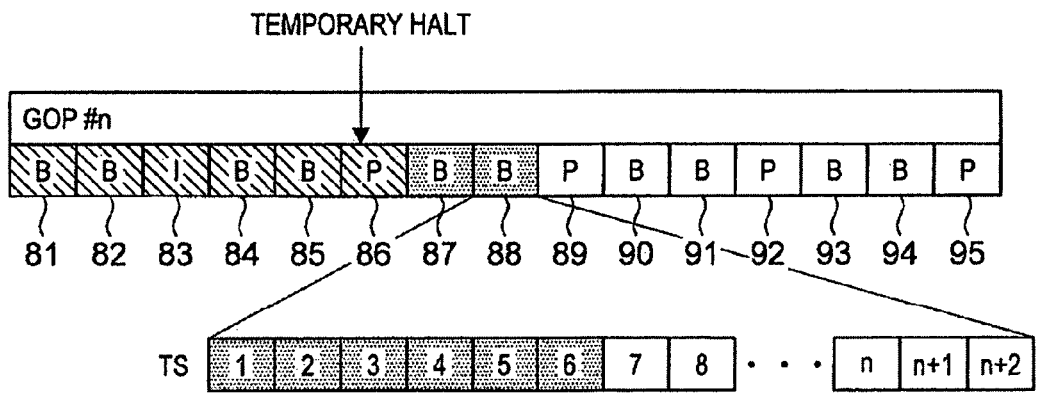
FIG. 10 illustrates a buffering state of the content playback device.

FIG. 10 illustrates a state of the buffer 222 in the content playback device 20 when content playback has been temporarily halted.

When a temporary halt is requested at a point when P-picture 86 in the GOP #n is being played back, indicated by the arrow, a B-picture 87 and a portion of a B-picture 88, for example, following the P-picture 86, may have been buffered. In the example shown in FIG. 10, the TS packets 1 to 6 included in the B-picture 88 have been buffered.

The TS packet 6, which is the last TS packet stored in the buffer 222 when the playback is temporarily halted, can be treated as a position where the acquisition of the content was temporarily stopped. For example, after the temporary halt request, the communication portion 216 may continue to receive streaming data that remains in the communication network 12 (due to lag time). That is, there may still be streaming data in transit to the content playback device 20 after the temporary halt request is issued. The remaining streaming data may be stored in buffer 222. The last TS packet received by the communication portion 216 before the temporary halt may therefore correspond to an acquisition stop position.

When a playback start request (i.e., a request to resume playback) is input after the temporary halt, the communication portion 216 may begin to receive the streaming data.

Figure 11:
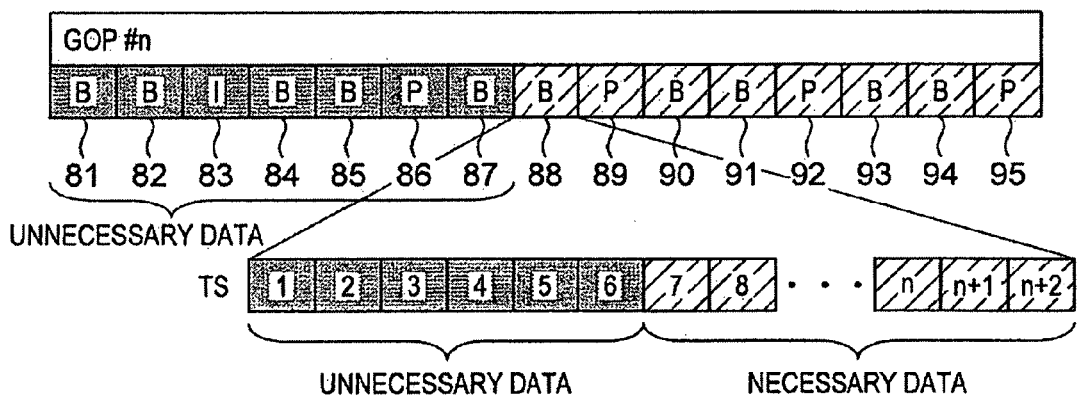
FIG. 11 illustrates streaming data received by the content playback device after a temporary halt.

FIG. 11 illustrates streaming data received by the content playback device after a temporary halt. Even if the content playback device 20 has buffered the streaming data up to the TS packet 6, the content playback device 20 may receive the streaming data from the beginning of the GOP #n (i.e., the B-picture 81) when playback is resumed. For example, the content provider server 10 may restart the transmission of the streaming data from the GOP closest to the TS packet 6 (FIG. 5), based on the TTS contained in the TS packet 6 (i.e., GOP #n).

Accordingly, when playback is restarted, the streaming processing portion 220 may discard "unnecessary" (i.e., redundant) streaming data, and may buffer streaming data received after the unnecessary data (i.e., streaming data that has not yet been buffered). In the example shown in FIG. 11, the unnecessary data may include data that has already been played back and data that has already been buffered; that is, data from the B-picture 81 to the TS packet 6 of the B-picture 88. In contrast, the necessary data (i.e., data not yet received and buffered) includes the TS packet 7 of the B-picture 88 and data thereafter.

The streaming processing portion 220 can identify the necessary and unnecessary streaming data based on based on the TTS (time stamp) and the SSRC identifier 109.

For example, the streaming processing portion 220 may store the TTS included in the TS packet at the acquisition stop position. Then, the streaming processing portion 220 may compare the stored TTS to the TTS included in the TS packets of streaming data received after playback is restarted (i.e., resumed). The streaming processing portion 220 may determine that TS packets having TTSs not later than the stored TTS are unnecessary data. On the other hand, the streaming processing portion 220 may determine that TS packets having TTSs later than the stored TTS are necessary data. Alternatively or additionally, the streaming processing portion 220 may distinguish between streaming data received before the temporary halt (i.e., the unnecessary data already buffered or played back) and streaming received after the temporary halt (i.e., necessary data not yet received or buffered) based on the SSRC identifier 109 included in each RTP packet of the streaming data.

Thus, the streaming processing portion 220 may selectively store in the buffer 222 streaming data received when the playback is restarted.

Figure 12:
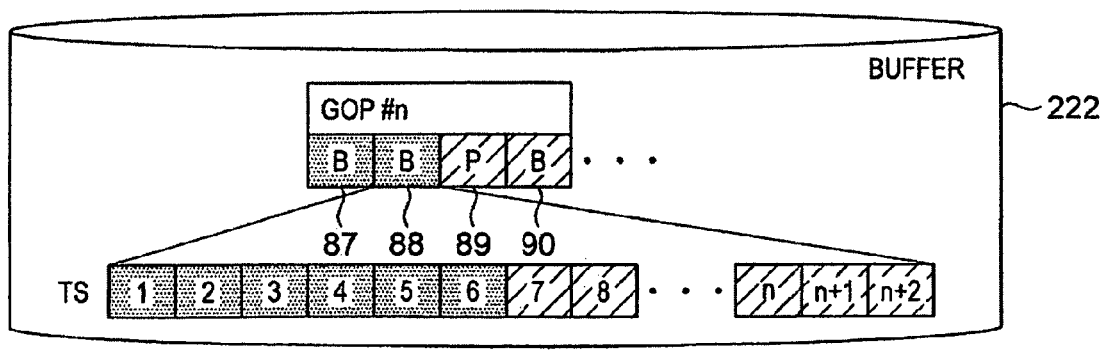
FIG. 12 illustrates a state of a buffer associated with the content playback device.

FIG. 12 illustrates a state of the buffer 222 when playback is restarted. The streaming processing portion 220 may store in the buffer 222 streaming data that follows the acquisition stop position. Thus, when playback is restarted, streaming data may be stored in the buffer 222 starting from the TS packet 7, which follows the TS packet 6 buffered before the temporary halt. In FIG. 12, data stored in the buffer 222 before the temporary halt is indicated by shading, while data stored in the buffer 222 after playback is restarted is indicated by cross-hatching.

Accordingly, the playback portion 230 can restart playback of the content after the temporary halt without rewinding or otherwise disturbing the content, using the streaming data stored in the buffer 222.

The acquisition control portion 264 may also restart the acquisition of streaming data received before the acquisition stop position. This may prevent content from being skipped after playback is resumed due to acquisition starting from streaming data that follows the acquisition stop position.

For example, when the playback has been temporarily halted, and the buffer 222 is in the state shown in FIG. 10, if acquisition of the streaming data is restarted from the GOP #n+1, part of the content may be skipped when the playback is restarted. By controlling the communication portion 216 to start acquisition of streaming data from a point that overlaps the streaming data stored in the buffer 222, it may be possible to maintain continuity between content played back before the temporary halt and content played back after the temporary halt.

The streaming processing portion 220 may start to supply the streaming data to the playback portion 230 after the detection portion 224 detects the streaming data (the TS packet) that follows the acquisition stop position. This may prevent a situation in which, at the point in time when the TS packet at the acquisition stop position is supplied to the playback portion 230, the next TS packet is not stored in the buffer 222, and the supply of the TS packets to the playback portion 230 is disrupted.

Figure 13:
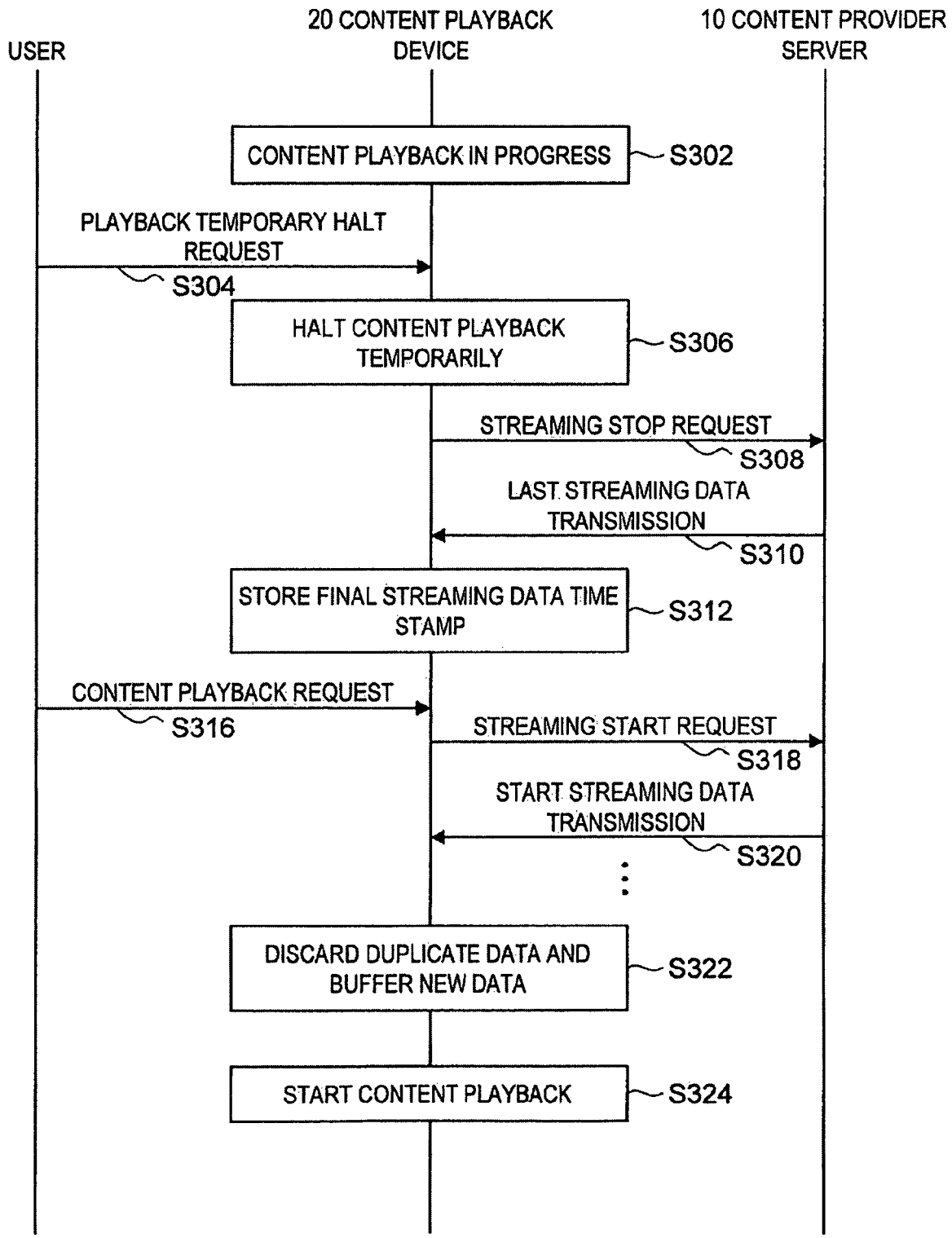
FIG. 13 illustrates a flowchart depicting a content playback method implemented in the content playback system.

FIG. 13 illustrates a flowchart depicting a content playback method implemented in the content playback system 1. First, the content playback device 20 may play back the content while receiving the streaming data from the content provider server 10 (step S302).

Subsequently, when the user requests a temporary halt of the playback (step S304), the playback control portion 262 may cause the streaming processing portion 220 and the playback portion 230 to temporarily halt the playback of the content (step S306). For example, the playback control portion 262 may cause the streaming processing portion 220 to stop the supply of the streaming data to the playback portion 230, and may cause the playback portion 230 to stop decoding.

Thus, the content playback device 20 can respond quickly to the user's request to temporarily halt playback of the playback of the content.

Next, the content playback device 20 may send a request to the content provider server 10 to stop transmission of the streaming data (step S308). When the content playback device 20 receives the last of the streaming data from the content provider server 10 (step S310), the content playback device 20 may store the TTS (the time stamp) included in the last streaming data (TS packet) (step S312).

When the playback of the content subsequently is requested by the user (step S316), the content playback device 20 may send a request to the content provider server 10 to restart (i.e., resume) transmission of the streaming data (step S318). The content provider server 10 may start transmission of the streaming data in response to the request (step S320).

The streaming processing portion 220 may discard data that overlaps the data already stored in the buffer 222, and may store in the buffer 222 the new streaming data (step S322). Then, the playback control portion 262 may cause the streaming processing portion 220 to supply the streaming data to the playback portion 230, and may cause the playback portion 230 to restart the playback of the content (step S324).

In the operation of the content playback device 20 described above, there may be a lag time between when the user inputs a request to play back the content (step S316) and when the playback of the content actually starts (step S324).

FIG. 14 illustrates a flowchart depicting another content playback method implemented in the content playback system 1. First, the content playback device 20 may play back the content while receiving the streaming data from the content provider server 10 (step S352).

When the user requests a temporary halt of the playback (step S354), the playback control portion 262 may cause the streaming processing portion 220 and the playback portion 230 to temporarily halt playback of the content (step S356). Then, after waiting for a specified length of time (step S358), the acquisition control portion 264 may send a request to the content provider server 10 to stop transmission of the streaming data (step S360). Then, the content playback device 20 may receive the last of the streaming data from the content provider server 10 (step S362), and may store the TTS (the time stamp) included in the last of the streaming data (TS packet) (step S364).

By requesting that transmission of the streaming data be stopped after waiting for the specified length of time (step S358), the acquisition control portion 264 may allow a larger amount of the streaming data that has not yet been played back to be stored in the buffer 222. When playback of the content is requested by the user (step S366), the playback control portion 262 can start the playback of the content based on the streaming data that has been stored in the buffer 222 (step S368), without waiting for the new streaming data to arrive. Therefore, even in a case where the playback control portion 262 starts playback of the content immediately in response to the playback request, the probability may be increased that the content can be played back continuously until subsequent-streaming data, continuous with the streaming data acquired before the temporary halt, is acquired.

Next, the content playback device 20 may send a request to the content provider server 10 to restart transmission of the streaming data (step S370). The content provider server 10 may start transmission of the streaming data in response to the request (step S372).

The streaming processing portion 220 of the content playback-device 20 may discard data that overlaps the data already stored in the buffer, and may store the new streaming data in the buffer 222 (step S374).

The specified length of time (step S358) may be determined based on the amount of the streaming data not yet played back that is buffered in the buffer 222 at the point in time when the content playback is temporarily halted (step S356), and on the speed at which the content provider server 10 responds to the request. The specification length of time may also be determined based on other factors such as propagation delay, a maximum difference between the acquisition stop position and an acquisition restart position, and/or other factors.

In the content playback device 20, the communication portion 216 may restart acquisition of the streaming data from the content provider server 10 in response to the playback request after a temporary halt. The playback portion 230, also in response to the playback request after the temporary halt, may restart playback of the content based on the streaming data that has been stored in the buffer 222.

Further, the streaming processing portion 220 may store in the buffer 222 only streaming data that follows the position at which acquisition of the streaming data was temporarily stopped, in response to the content playback request. Therefore, when the communication portion 216 acquires streaming data that overlaps streaming data acquired before the temporary halt, the streaming processing portion 220 can store the new streaming data in the buffer 222 and discard the overlapping data. This makes it possible for the playback portion 230 to restart playback of the content after the temporary halt while preventing the content from being rewound (i.e., played back from a previous position).

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention.

For example, the individual processing steps of the content playback system 1 do not necessarily have to be performed in the order described. The steps may be performed in parallel, individually, or in a different order, without departing from the spirit and scope of the invention.

Further, the hardware of components of the content playback device 20, such as the CPU 201, the ROM 202, the RAM 203, and/or other hardware elements, may alternatively or additionally be implemented in software and/or combinations of hardware and software. For example, the functions of content playback device 20 described above may be performed a computer executing one or more computer programs. Likewise, processes disclosed herein can be implemented in hardware. For example, the function blocks of the content playback device 20 shown in FIG. 7 may be implemented by way of discrete hardware components.

Computer programs based on the written description and methods of disclosed herein are within the skill of an experienced developer. The various programs or program modules can be created using any techniques known to one skilled in the art or can be designed in connection with existing software. The computer programs can be stored on a computer-readable storage medium, such as optical storage, magnetic storage, solid state storage, a CD, a DVD, a hard drive, RAM, ROM, a flash drive, and/or any other suitable computer-readable storage medium.

While illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure.

The limitations in the claims are to be interpreted based on the language employed in the claims and not limited to examples described in the present specification or during the prosecution of the application, which examples are to be construed as non-exclusive. It is intended, therefore, that the specification and examples be considered as exemplary only, with a true scope and spirit of the invention being indicated by the following claims and their full scope of equivalents.

What is claimed is:

1. A content playback device, comprising:
   a storage medium;
   a data acquisition portion that acquires streaming data for content from a data transmission device, the streaming data including a plurality of packets with respective time stamp information;
   a storage portion that buffers the acquired streaming data in the storage medium;
   a playback portion that plays back the content based on the buffered streaming data;
   a playback control portion that requests the playback portion to halt playback of the content in response to a halt playback request; and
   an acquisition control portion that:
      requests the data acquisition portion to stop acquisition of the streaming data in response to the halt playback request;
      requests the data acquisition portion to restart acquisition of the streaming data in response to a resume playback request, the restarted streaming data including a plurality of packets with respective timestamp information;
      compares the timestamp information of the buffered streaming data with the timestamp information of the restarted streaming data;
      discards packets of the restarted streaming data corresponding to the compared timestamp information when the comparison indicates a first result; and
      instructs the storage portion to buffer, in the storage medium, the packets of the restarted streaming data corresponding to the compared timestamp information when the comparison indicates a second result, such that playback resumes starting from a position at which the acquisition of the streaming data was stopped.

2. The content playback device according to claim 1, further comprising:
   a detection portion that detects whether an amount of the streaming data starting from the position at which the acquisition was stopped has been acquired by the data acquisition portion,
   wherein the playback control portion causes the playback portion to play back the content when it is detected that the amount of streaming data has been acquired.

3. The content playback device according to claim 1, wherein:
   the acquisition control portion causes the data acquisition portion to halt the acquisition of the streaming data when the acquisition of the streaming data has continued for a specified length of time after the halt playback request, and
   the playback control portion causes the playback portion to start playback of the content in response to the resume playback request.

4. The content playback device according to claim 1, wherein the acquisition control portion causes the data acquisition portion to restart the acquisition of the streaming data from a position before the stop position in response to the resume playback request.

5. The content playback device according to claim 1, wherein:
   the acquisition control portion determines the stop position from the comparison of the timestamp information, and
   the acquisition control portion instructs the storage portion to buffer, in the storing medium, packets of the restarted streaming data that follow the acquisition stop position in response to the resume playback request.

6. A content playback method, comprising:
   acquiring streaming data for content from a data transmission device, the streaming data including a plurality of packets with respective time stamp information;
   buffering the streaming data in a storage medium;
   playing back the content based on the buffered streaming data;
   halting playback of the content in response to a halt playback request;
   requesting stopping acquisition of the streaming data in response to the halt playback request;
   requesting restarting acquisition of the streaming data in response to a resume playback request, the restarted streaming data including a plurality of packets with respective timestamp information;
   comparing the timestamp information of the buffered streaming data with the timestamp information of the restarted streaming data;

discarding packets of the restarted streaming data corresponding to the compared timestamp information when the comparison indicates a first result; and buffering, in the storage medium, the packets of the restarted streaming data corresponding to the compared timestamp information when the comparison indicates a second result, such that playback resumes starting from a position at which acquisition of the streaming data was stopped.

7. The method according to claim 6, further comprising:
detecting whether an amount of the streaming data starting from the position at which the acquisition was stopped has been acquired; and
playing back the content when it is detected that the amount of streaming data has been acquired.

8. The method according to claim 6, further comprising:
halting the acquisition of the streaming data when the acquisition of the streaming data has continued for a specified length of time after the halt playback request, and
playing back the content in response to the resume request.

9. The method according to claim 6, wherein the acquisition is restarted from a position before the position at which the acquisition was stopped.

10. The method according to claim 6, further comprising:
determining the position at which acquisition was stopped from comparison of the timestamp information; and
buffering, in the storage medium, packets of the restarted streaming data that follow the position at which acquisition was stopped in response to the resume playback request.

11. A computer-readable storage medium storing a computer program which, when executed by a content playback device, causes the content playback device to perform a content playback method, the method comprising:
acquiring streaming data for content from a data transmission device, the streaming data including a plurality of packets with respective time stamp information;
buffering the streaming data in a storage medium;
playing back the content based on the buffered streaming data;
halting playback of the content in response to a halt playback request;
requesting stopping acquisition of the streaming data in response to the halt playback request;
requesting restarting acquisition of the streaming data in response to a resume playback request, the restarted streaming data including a plurality of packets with respective timestamp information;
comparing the timestamp information of the buffered streaming data with the timestamp information of the restarted streaming data;
discarding packets of the restarted streaming data corresponding to the compared timestamp information when the comparison indicates a first result; and
buffering, in the storage medium, the packets of the restarted streaming data corresponding to the compared timestamp information when the comparison indicates a second result, such that playback resumes starting from a position at which acquisition of the streaming data was stopped.

12. The computer-readable storage medium according to claim 11, the method further comprising:
detecting whether an amount of the streaming data starting from the position at which the acquisition was stopped has been acquired; and playing back the content when it is detected that the amount of streaming data has been acquired.

13. The computer-readable storage medium according to claim 11, the method further comprising:
halting the acquisition of the streaming data when the acquisition of the streaming data has continued for a specified length of time after the halt playback request, and
playing back the content in response to the resume request.

14. The computer-readable storage medium of claim 11, wherein the acquisition is restarted from a position before the position at which the acquisition was stopped.

15. The computer-readable storage medium of claim 11, the method further comprising:
determining the position at which acquisition was stopped from comparison of the timestamp information; and
buffering, in the storage medium, packets of the restarted streaming data that follow the position at which acquisition was stopped in response to the resume playback request.

16. A content playback system comprising a data transmission device that transmits streaming data for content and a content playback device that plays back the content based on the streaming data, wherein the content playback device comprises:
a storage medium;
a data acquisition portion that acquires the streaming data for content from the data transmission device, the streaming data including a plurality of packets with respective time stamp information;
a storage portion that buffers the acquired streaming data in the storage medium;
a playback portion that plays back the content based on the buffered streaming data;
a playback control portion that requests the playback portion to halt playback of the content in response to a halt playback request; and
an acquisition control portion that:
requests the data acquisition portion to stop acquisition of the streaming data in response to the halt playback request;
requests the data acquisition portion to restart acquisition of the streaming data in response to a resume playback request, the restarted streaming data including a plurality of packets with respective timestamp information;
compares the timestamp information of the buffered streaming data with the timestamp information of the restarted streaming data;
discards packets of the restarted streaming data corresponding to the compared timestamp information when the comparison indicates a first result; and
instruct the storage portion to buffer, in the storage medium, the packets of the restarted streaming data corresponding to the compared timestamp information when the comparison indicates a second result, such that playback resumes, starting from a position at which the acquisition of the streaming data was stopped.

17. The content playback system according to claim 16, wherein the content playback device further comprises:
a detection portion that detects whether an amount of the streaming data starting from the position at which the acquisition was stopped has been acquired by the data acquisition portion, wherein the playback control portion causes the playback portion to play back the content when it is detected that the amount of streaming data has been acquired.

18. The content playback system according to claim 16, wherein:
- the acquisition control portion causes the data acquisition portion to halt the acquisition of the streaming data when the acquisition of the streaming data has continued for a specified length of time after the halt playback request, and
- the playback control portion causes the playback portion to start playback of the content in response to the resume playback request.

19. The content playback system according to claim 16, wherein the acquisition control portion causes the data acquisition portion to restart the acquisition of the streaming data from a position before the stop position in response to the resume playback request.

20. The content playback system according to claim 16, wherein:
- the acquisition control portion determines the stop position from the comparison of the timestamp information, and
- the acquisition control portion instructs the storage portion to store, in the storing medium, packets that follow the acquisition stop position in response to the resume playback request.

* * * * *